A. H. CHAUFOURAUX.
AIR COOLING APPARATUS.
APPLICATION FILED SEPT. 22, 1920.
1,434,368.
Patented Nov. 7, 1922.
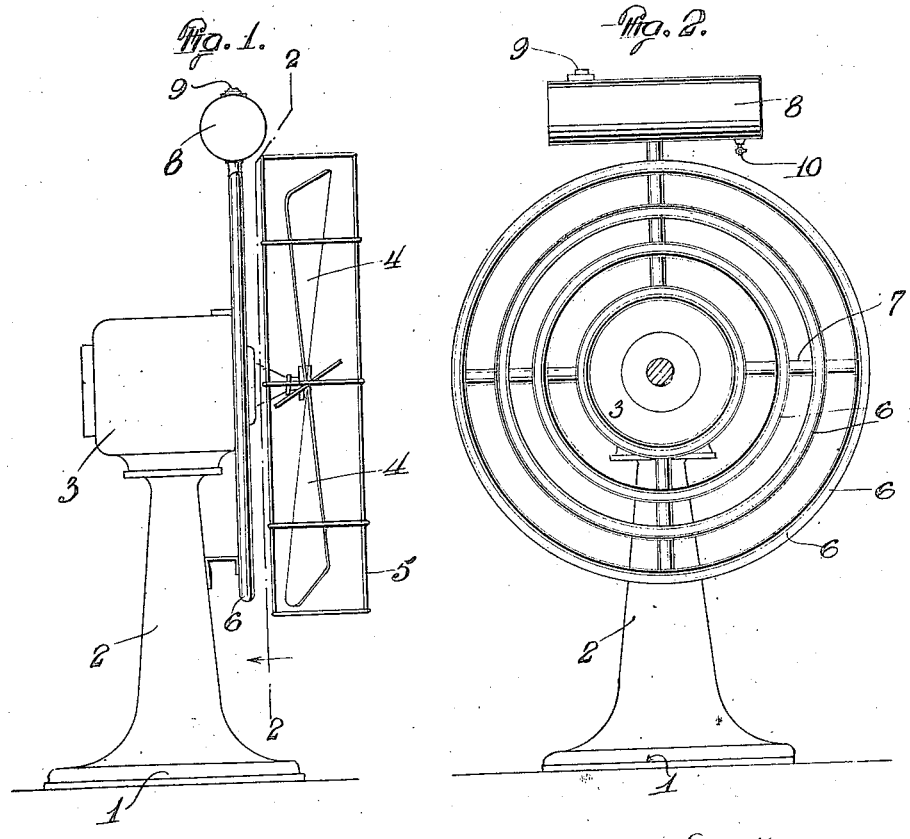
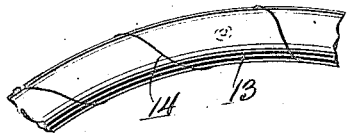
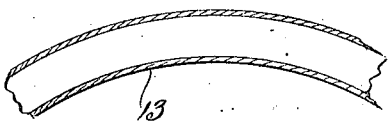
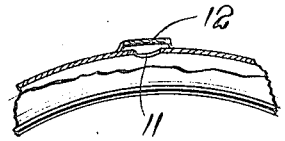
Inventor Patented Nov. 7, 1922.

1,434,368

UNITED STATES PATENT OFFICE.

ARMAND H. CHAUFOURAUX, OF ST. LOUIS, MISSOURI.

AIR-COOLING APPARATUS.

Application filed September 22, 1920. Serial No. 411,983.

*To all whom it may concern:*

Be it known that I, ARMAND H. CHAUFOURAUX, a citizen of the United States, residing at St. Louis, in the city of St. Louis and State of Missouri, have invented certain new and useful Improvements in an Air-Cooling Apparatus, of which the following is a specification.

This invention relates to air cooling apparatus and more particularly to a device for attachment to an electric fan for the purpose of moistening and cooling the air agitated by the blades of the fan whereby the atmosphere will be moistened and cooled while the apparatus is in operation.

One of the objects of the invention is to provide an attachment which can be conveniently mounted on an ordinary electric fan and connected to a supply tank whereby a quantity of water will be available to continue the distribution of moist air while the fan is in operation.

Other objects of the invention will appear upon consideration of the following detail description and accompanying drawings, wherein:—

Figure 1 is a side elevation of a fan showing the attachment mounted thereon,

Figure 2 is a cross section taken on the line 2—2 of Fig. 1, looking in the direction indicated by the arrow.

Figures 3, 4 and 5 are views of details of the invention.

Referring to the drawing by numerals, the fan structure includes the base 1 and pedestal 2 upon which the motor 3 is arranged whereby the fan blades 4 may be driven. The fan blades 4, as usual are mounted in a cage or protecting structure 5.

A grille work of piping is adapted to be mounted back of the protecting cage 5 and behind the blades of the fan. This grille work is shown in Fig. 2 and consists of circular sections of pipe 6 any number of which may be provided according to the size of the fan and the quantity of moisture to be distributed. Each circular section 6 is connected to radially extending pipes 7 whereby all of the pipe sections 6 are connected together for intercommunication. Mounted above the net work is a supply tank 8 which, as will be readily understood, may be of any desired size. The tank may be filled through the opening normally closed by a removable plug 9 and the tank may be drained through a drain cock 10.

All of the pipes in the device are provided with series of small openings 11 each of which is partially covered by a saddle or cover plate 12 arranged in superposed relation with respect to the pipe so that the covering for the pipe will not obstruct the opening 11 as will presently appear. The pipes 6 and 7 are preferably covered by a suitable fabric which will absorb the moisture as it passes through the openings 11 and thus become thoroughly saturated while the apparatus is in use. The protecting saddles or cover plates 12 will prevent the fabric from entirely obstructing the passage of the water and the latter will thereby be distributed as a moisture into the air sucked by the fan blades to moisten and cool the atmosphere while the fan is in operation. The fabric covering 13 may be of any desirable material and should be loosely wound upon the piping and held by retaining wire 14 wound around the material.

Minor changes may be made in the details of construction without departing from the spirit of the invention or the scope of the claim hereunto appended.

What I claim is—

In combination with an electric fan having fan blades movable in a vertical plane, of a series of circular pipes arranged behind the blades and connected together for intercommunication and provided with a series of small openings, a protective covering of absorbent material wound upon the said piping, means carried by the circular pipe and spaced above the openings therein to prevent the covering of absorbent material from closing the openings in said pipe, said protective covering of absorbent material adapted to receive water through the openings to be absorbed by the said material and winding coils around the material to maintain it in position, means to mount the said grille work in a vertical plane behind the blades of the fan, the said tank being arranged above the grille work whereby the water will be distributed to the grille work by gravity.

In testimony whereof, I have affixed my signature in the presence of two witnesses.

ARMAND H. CHAUFOURAUX.

Witnesses:
 JOHN KOELLER,
 A. B. STRUSS.